US009800824B2

(12) United States Patent
Davis

(10) Patent No.: US 9,800,824 B2
(45) Date of Patent: Oct. 24, 2017

(54) VIDEO SIGNAL ANALYSIS

(75) Inventor: Andrew G Davis, Little Bealings (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 1257 days.

(21) Appl. No.: 12/598,522

(22) PCT Filed: Apr. 11, 2008

(86) PCT No.: PCT/GB2008/001276
§ 371 (c)(1),
(2), (4) Date: Nov. 2, 2009

(87) PCT Pub. No.: WO2008/139135
PCT Pub. Date: Nov. 20, 2008

(65) Prior Publication Data
US 2010/0141835 A1 Jun. 10, 2010

(30) Foreign Application Priority Data

May 9, 2007 (EP) .................................... 07251908

(51) Int. Cl.
H04N 5/14 (2006.01)
H04N 7/01 (2006.01)

(52) U.S. Cl.
CPC ........... H04N 7/012 (2013.01); H04N 7/0115 (2013.01)

(58) Field of Classification Search
CPC ............ H04N 7/64; H04N 7/04; H04N 7/012; H04N 7/0115
(Continued)

(56) References Cited

U.S. PATENT DOCUMENTS 5,291,280 A 3/1994 Faroudja et al.
5,317,398 A 5/1994 Casavant et al.
(Continued)

FOREIGN PATENT DOCUMENTS

JP 2000-270332 9/2000
JP 2004-7719 1/2004

OTHER PUBLICATIONS

International Search Report for PCT/GB2008/001276, dated Jul. 21, 2008.
(Continued)

Primary Examiner — Mohammed Rahaman
Assistant Examiner — Richard Carter
(74) Attorney, Agent, or Firm — Nixon & Vanderhye P.C.

(57) ABSTRACT

In order to detect interlace errors in a video signal, one receives successive digitally coded frames, each frame comprising data for a field of a first type and data for a field of a second type (i.e. a top field and bottom field or vice versa). One then generates for each field of the first type:—a first difference signal (D1 F1) representative of the difference between the field and the second-type field of the previous frame;—a second difference signal (D1 F2) representative of the difference between the field and the second-type field of the same frame; and—a third difference signal (D1 F3) representative of the difference between the field and the second-type field of the following frame. Then, in dependence of the values of said difference signals, a decision signal (wOFlag) is generated indicating an estimated temporal relationship of the field to the second-type field of the same frame. This can be compared with a signal (IDFO) indicating a purported temporal relationship, and an alarm signal (wEFlag) generated in the event of a mismatch.

12 Claims, 11 Drawing Sheets

Field order detection process

(58) Field of Classification Search
USPC ...... 348/558, 448, 97; 375/240.16; 386/131, 386/69
See application file for complete search history.

(56) References Cited

U.S. PATENT DOCUMENTS

| | | | |
|---|---|---|---|
| 5,398,071 A | | 3/1995 | Gove et al. |
| 5,406,333 A | | 4/1995 | Martin |
| 5,689,301 A | | 11/1997 | Christopher et al. |
| 5,835,163 A | | 11/1998 | Liou et al. |
| 5,852,473 A | * | 12/1998 | Horne et al. ............ 348/558 |
| 5,903,319 A | | 5/1999 | Busko et al. |
| 5,929,902 A | | 7/1999 | Kwok |
| 6,014,182 A | | 1/2000 | Swartz |
| 6,055,018 A | | 4/2000 | Swan |
| 6,058,140 A | | 5/2000 | Smolenski |
| 6,148,035 A | | 11/2000 | Oishi et al. |
| 6,154,257 A | * | 11/2000 | Honda et al. ............ 348/558 |
| 6,157,412 A | | 12/2000 | Westerman et al. |
| 6,205,177 B1 | | 3/2001 | Girod et al. |
| 6,236,806 B1 | | 5/2001 | Kojima et al. |
| 6,563,550 B1 | | 5/2003 | Kahn et al. |
| 6,633,612 B2 | * | 10/2003 | Selby ............... 375/240.16 |
| 7,453,941 B1 | | 11/2008 | Yamori et al. |
| 2001/0002853 A1 | | 6/2001 | Lim |
| 2003/0098924 A1 | | 5/2003 | Adams et al. |
| 2005/0018086 A1 | | 1/2005 | Lee et al. |
| 2005/0123274 A1 | * | 6/2005 | Crinon et al. ............. 386/69 |
| 2006/0119702 A1 | * | 6/2006 | Lin ......................... 348/97 |
| 2006/0139491 A1 | * | 6/2006 | Baylon ............... H04N 5/144 348/558 |
| 2006/0215057 A1 | * | 9/2006 | Tanaka ............... H04N 5/14 348/448 |
| 2007/0031129 A1 | * | 2/2007 | Hosokawa ............... 386/131 |
| 2008/0122973 A1 | * | 5/2008 | Iwasaki ............... H04N 7/012 348/448 |

OTHER PUBLICATIONS

Office Action (5 pgs.) dated Apr. 7, 2011 issued in corresponding Chinese Application No. 200880015053.3 with an at least partial English-language translation thereof (6 pgs.).
ITU-R Rec. BT.601, "Studio encoding parameters of digital television for standard 4:3 and wide screen 16:9 aspect ratios," http://www.itu.int/rec/R-REC-BT.601/en.
Decision to Grant a European Patent (1 pg.) dated Oct. 25, 2012 issued in corresponding European Application No. 08 736 941.9.
Office Action (2 pgs.) dated Sep. 8, 2011 issued in corresponding Chinese Application No. 200880015053.3 with an at least partial English-language translation thereof (3 pgs.).
Office Action (3 pgs.) dated Mar. 29, 2010 issued in corresponding European Patent Application No. 08 736 941.9.
Applicant Response to Office Action dated Mar. 29, 2010 issued in corresponding European Patent Application No. 08 736 941.9.
Office Action (4 pgs.) dated Jun. 23, 2014 issued in corresponding Korean Application No. 2009-7024444 with an at least partial English-language translation thereof (2 pgs.).

* cited by examiner

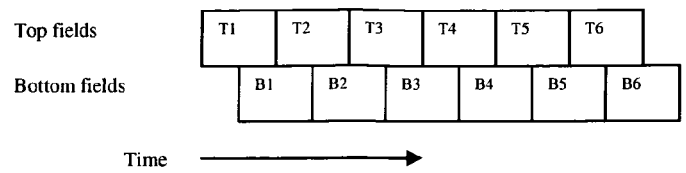
Figure 1    TFF interlaced fields
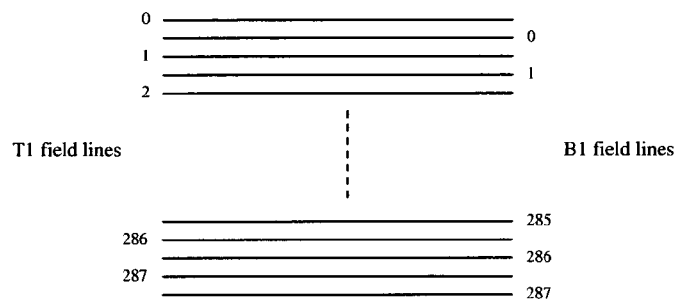
Figure 2    Field interlacing for Frame 1.
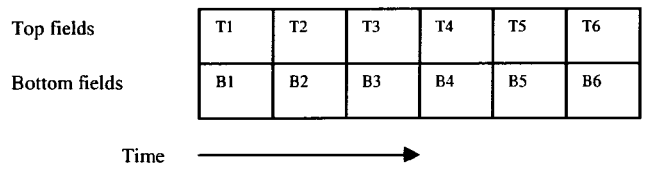
Figure 3    Field timing for progressive frames.
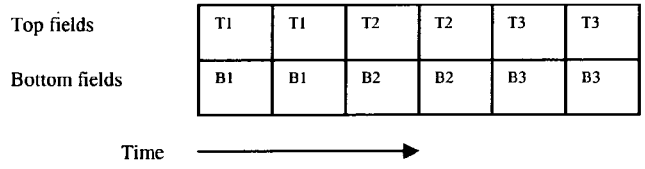
Figure 4    Field timing for frame-repeated progressive frames.
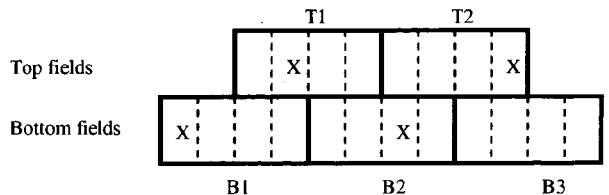
Figure 5    Motion in BFF interlaced fields

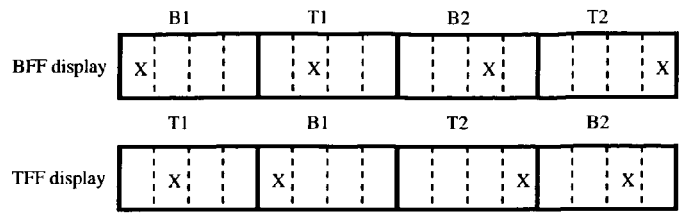
Figure 6  BFF and TFF display field ordering for BFF content.
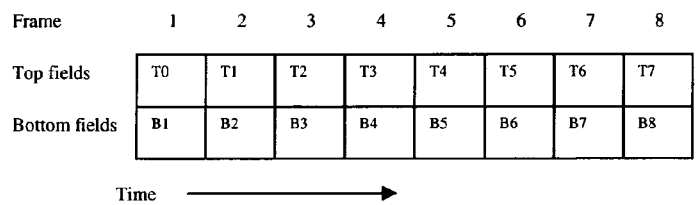
Figure 7  Progressive video with TFF field-misalignment
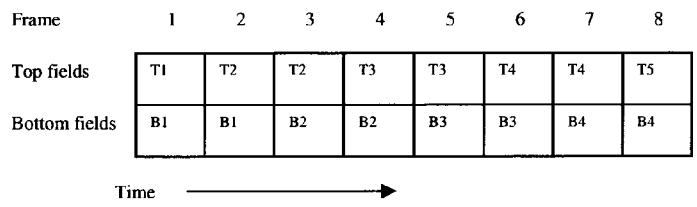
Figure 8  Progressive frame-repeated video with BFF field-misalignment
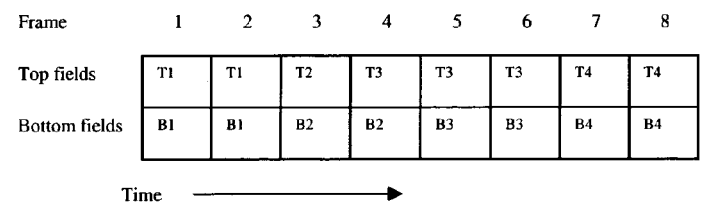
Figure 9  Progressive video with intermittent BFF field-misalignment
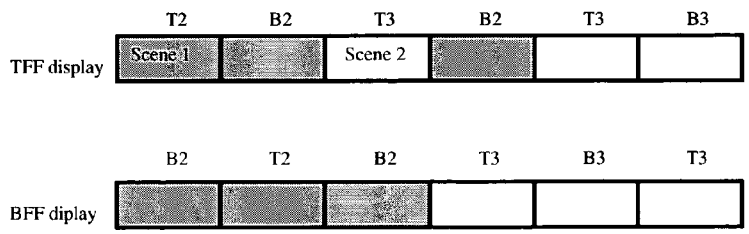
Figure 10  Progressive source with intermittent BFF field-misalignment

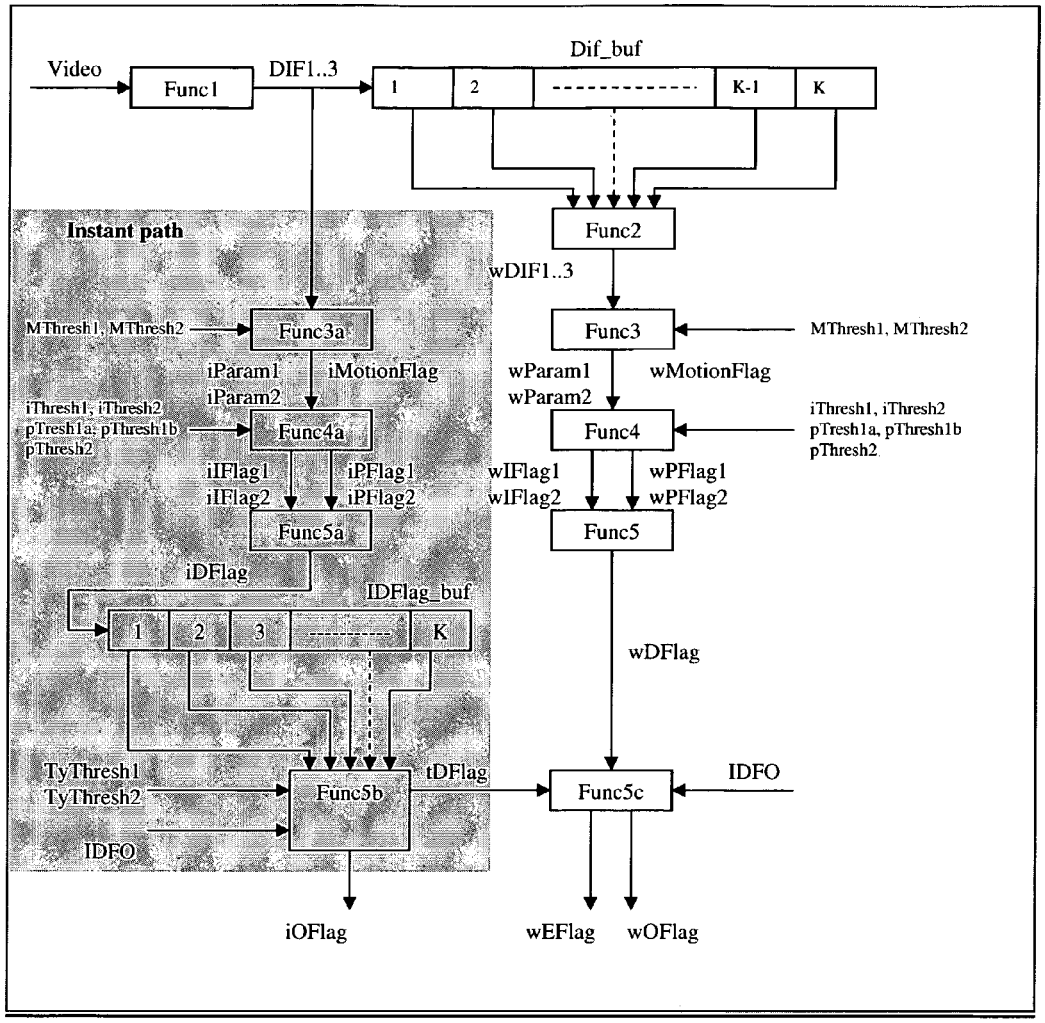
Figure 11  Field order detection process
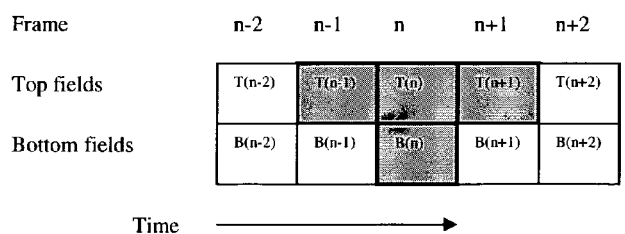
Figure 12  Field analysis for Frame(n).

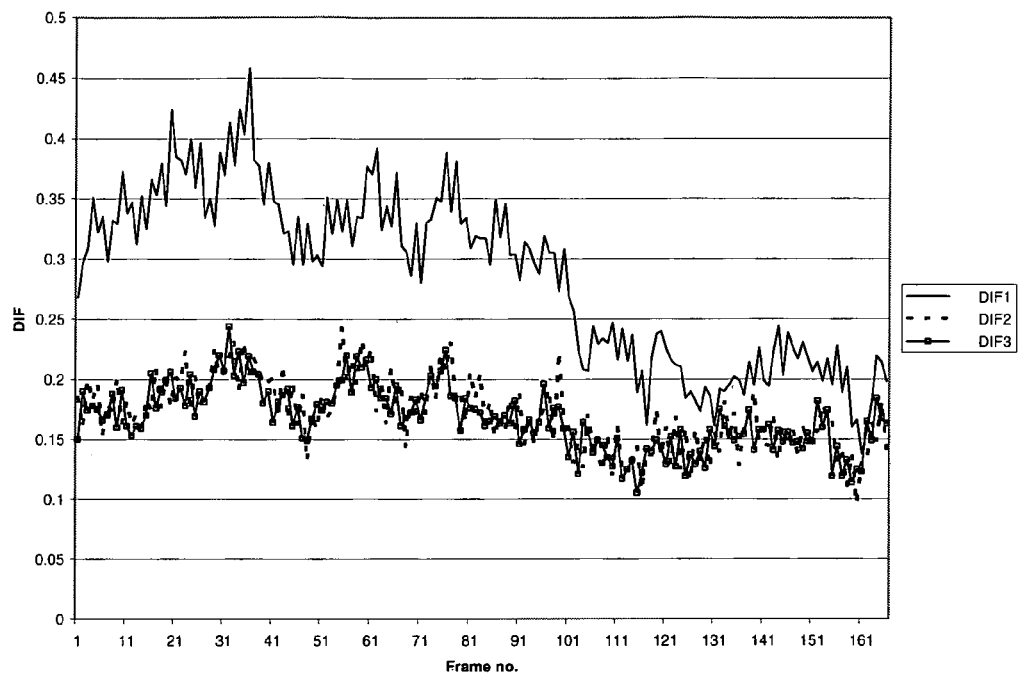
Figure 13    "Instant" frame DIF values for TFF interlaced content
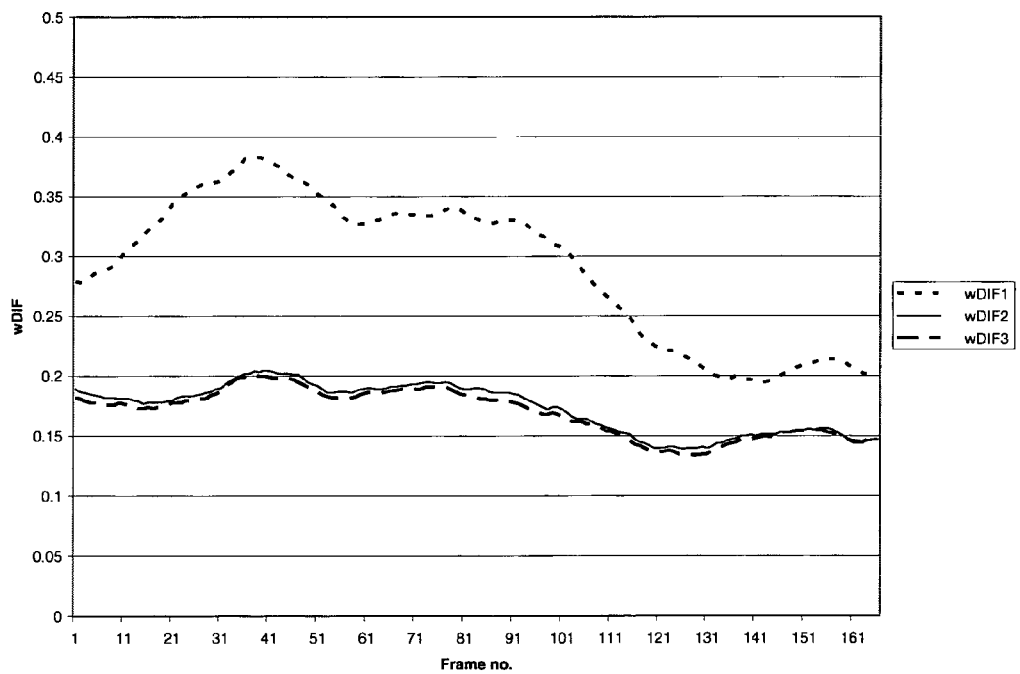
Figure 14    Averaged frame DIF values (wDIF1..3) for TFF interlaced content

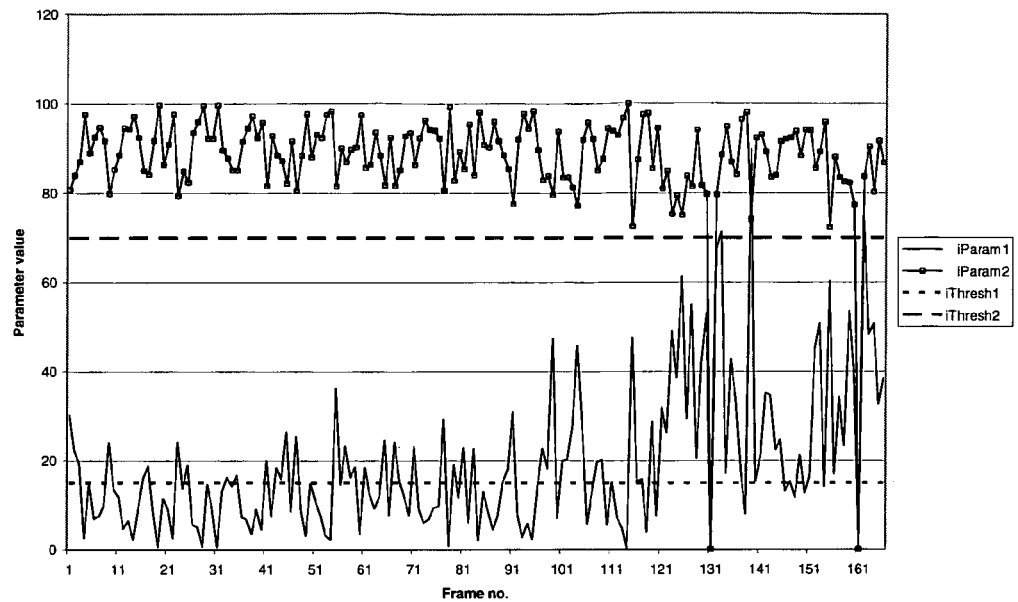
Figure 15    Decision parameters calculated from "instant" DIF values
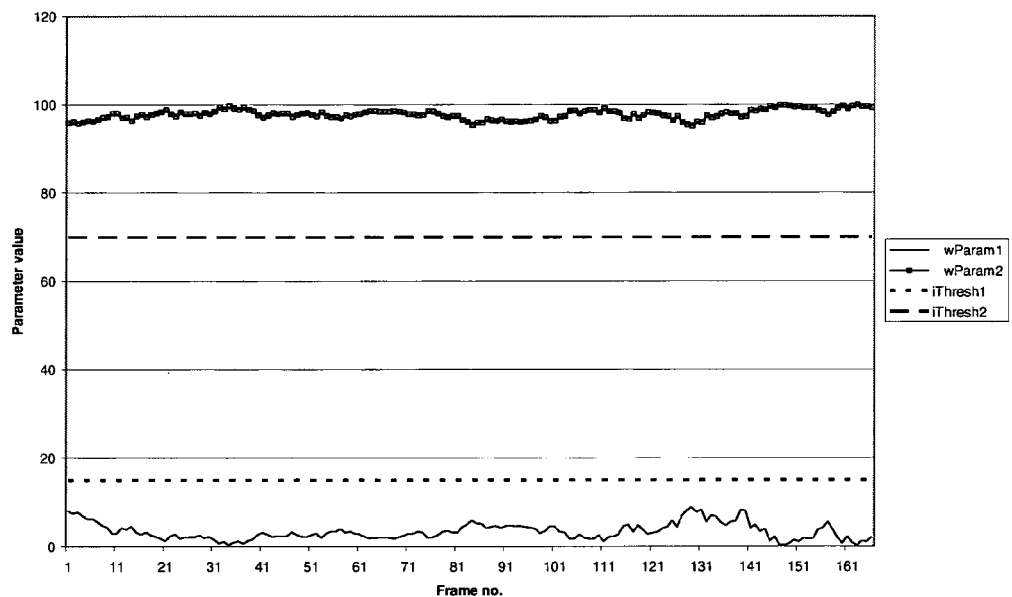
Figure 16    Decision parameters calculated from "windowed" DIF values

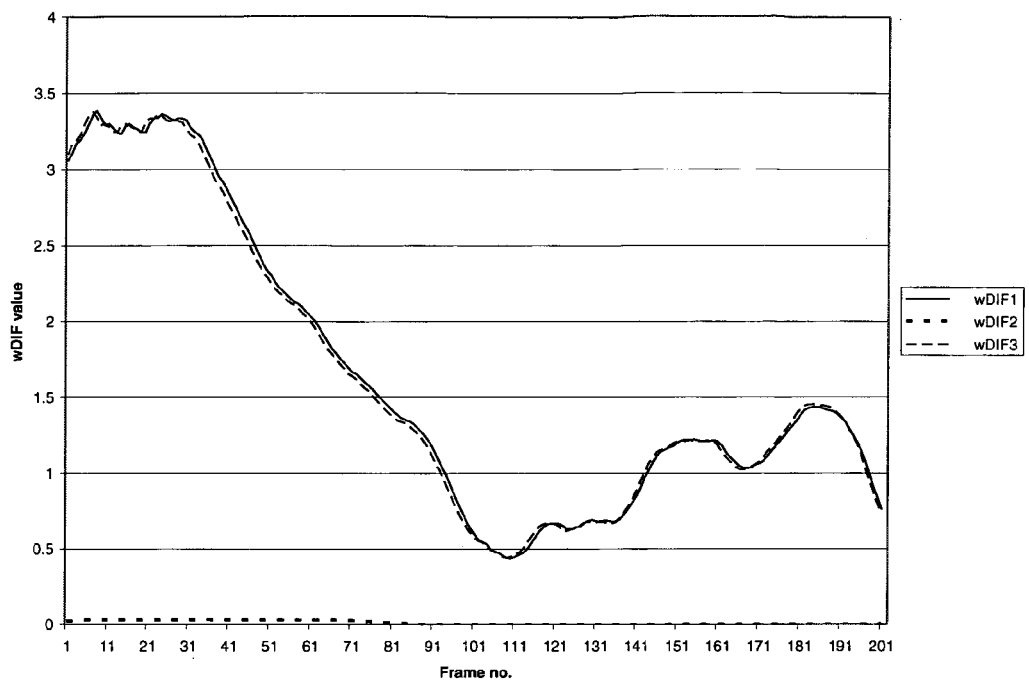
Figure 17    "Windowed" DIF values for correctly aligned progressive content
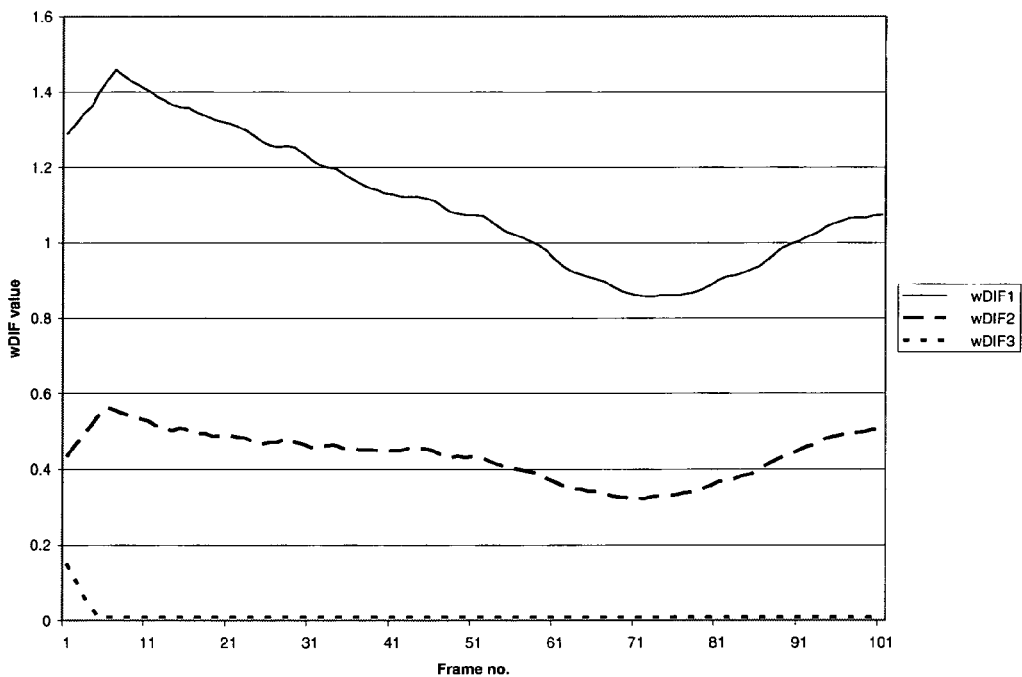
Figure 18    "Windowed" DIF values for TFF misaligned progressive content

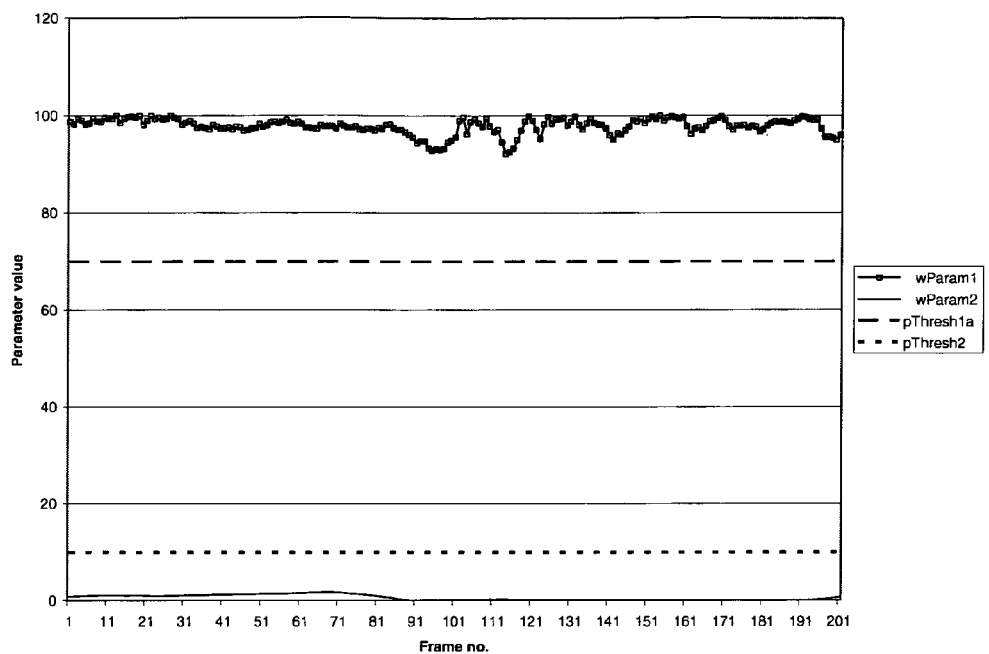
Figure 19    wParam decision parameters for correctly aligned progressive content
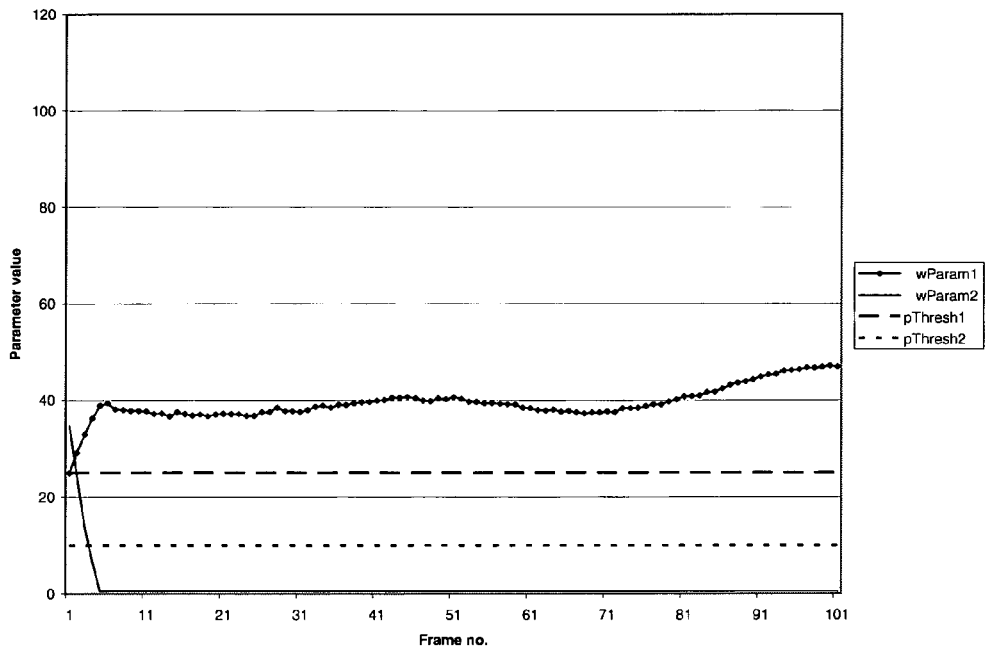
Figure 20    wParam decision parameters for TFF misaligned progressive content

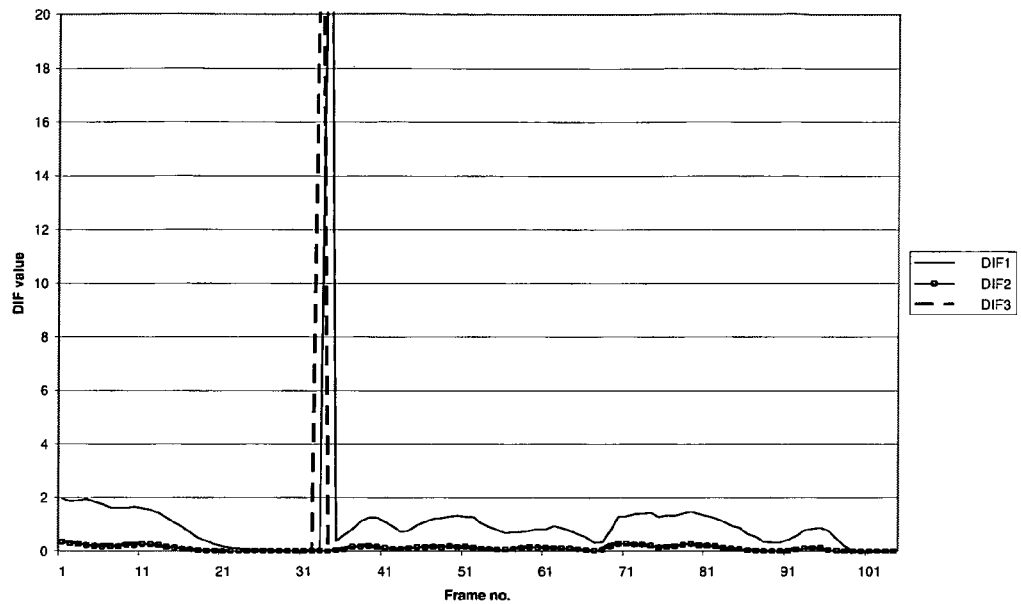
Figure 21    DIF values for TFF interlaced video with scene-cut.
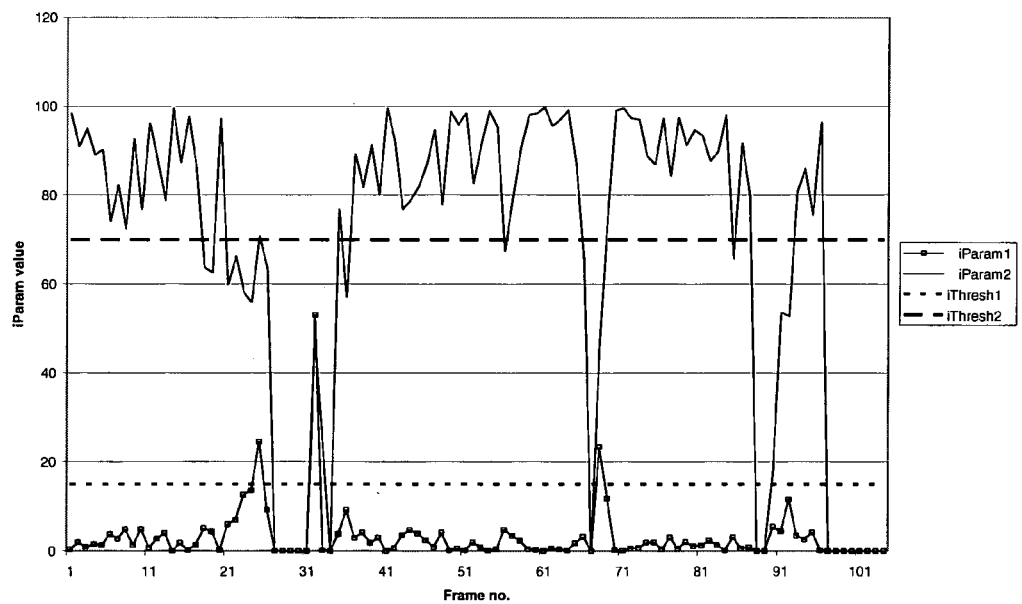
Figure 22    "Instant" decision parameters for TFF interlaced video with scene-cut

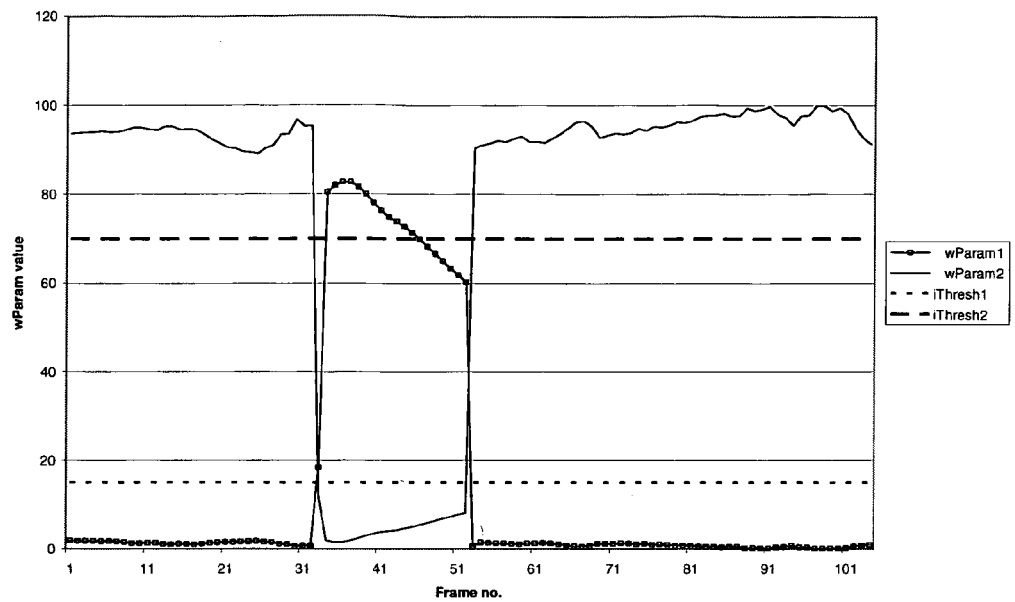
Figure 23  "Windowed" decision parameters for TFF interlaced video with scene-cut
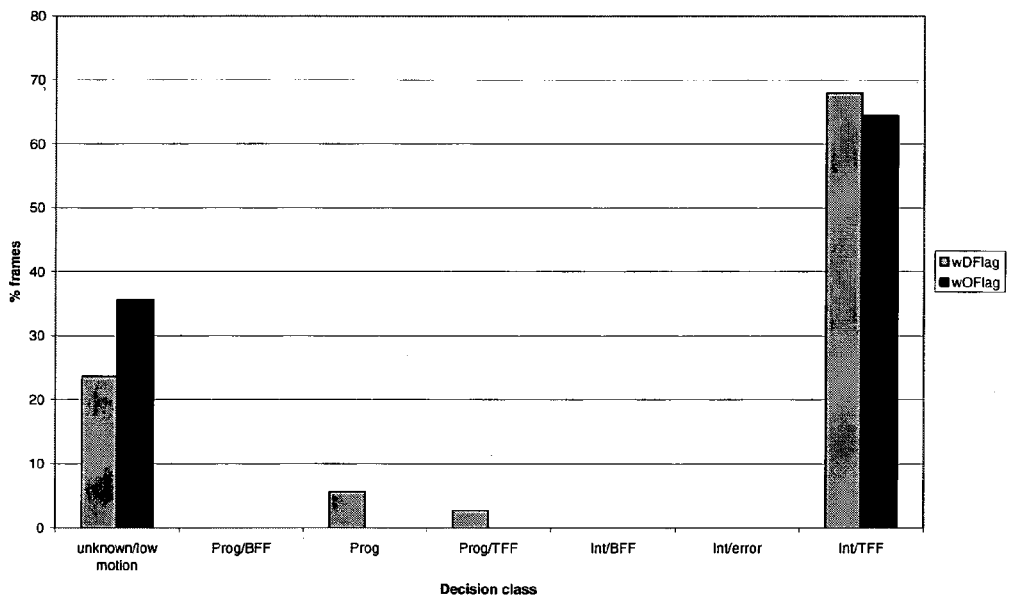
Figure 24  "Windowed" and "combined" analysis of 20 minutes of TFF interlaced content

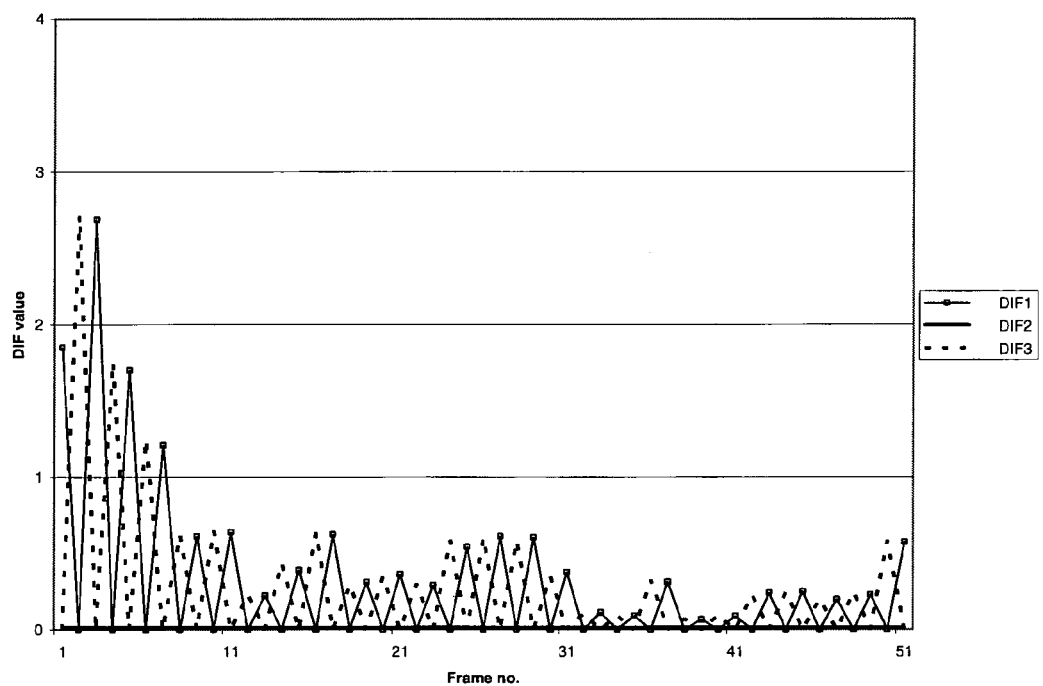
Figure 25    Instant DIF values for 2x frame-repeated progressive content.

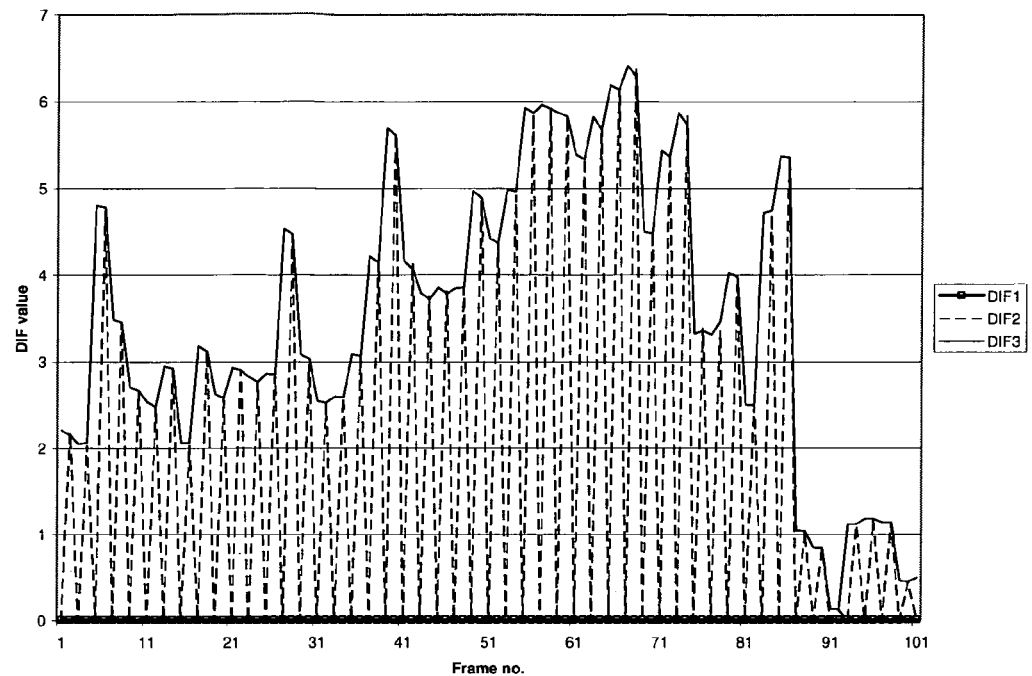
Figure 26    Instant DIF values for BFF misaligned 2x frame-repeated progressive content
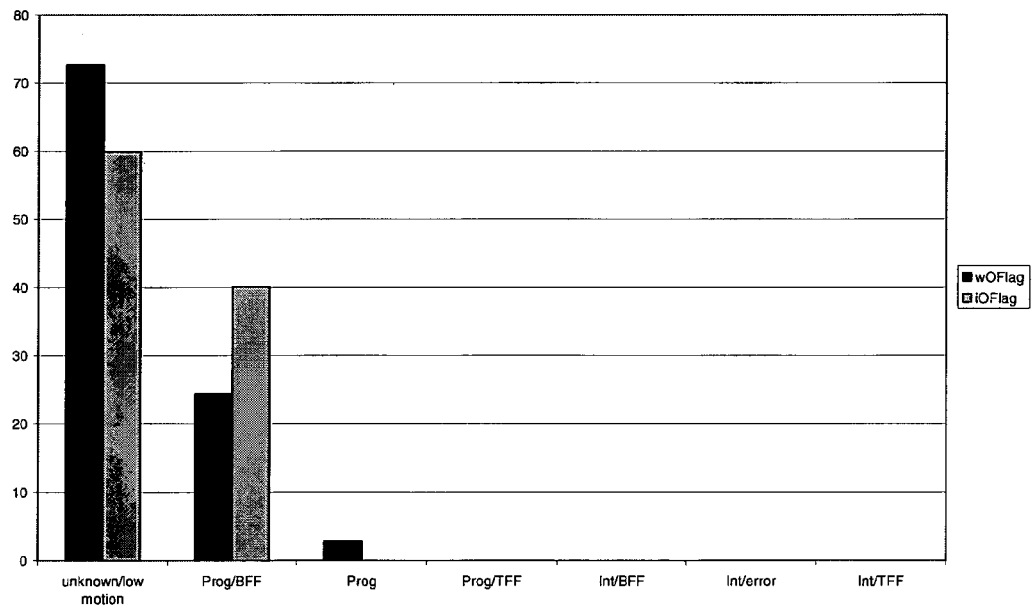
Figure 27    Chart for analysis frame-repeated progressive with variable BFF misalignment

VIDEO SIGNAL ANALYSIS

This application is the U.S. national phase of International Application No. PCT/GB2008/001276 filed 11 Apr. 2008, which designated the U.S. and claims priority to EP Application No. 07251908.5 filed 9 May 2007, the entire contents of each of which are hereby incorporated by reference.

1. BACKGROUND AND SUMMARY

The present invention relates to the analysis of video sequences for display on interlaced systems such as those according to BT.601 [1]. In such systems, the use of incorrect field ordering (top-field-first (TFF) or bottom-field-first (BFF) can result in noticeable and objectionable effects in the display of both interlaced and progressive-type sequences.

According to the present invention there is provided a method of detecting field order of a video signal, comprising:

receiving successive digitally coded frames, each frame comprising data for a field of a first type and data for a field of a second type;

generating for each field of the first type:
a first difference signal (DIF1) representative of the difference between the field and the second-type field of the previous frame;
a second difference signal (DIF2) representative of the difference between the field and the second-type field of the same frame;
a third difference signal (DIF3) representative of the difference between the field and the second-type field of the following frame; and
in dependence of the values of said difference signals, a decision signal (wOFlag) indicating an estimated temporal relationship of the field to the second-type field of the same frame.

Other aspects of the invention are set out in the claims.

BRIEF DESCRIPTION OF THE DRAWINGS

Some embodiments of the invention will now be described, by way of example, with reference to the accompanying drawings, in which:

FIGS. 1 to 10 and 12 are timing diagrams for use in explaining embodiments of the invention;

FIG. 11 is a functional block diagram showing the operation of one embodiment of the invention; and FIGS. 12 to 27 are graphs showing results obtained.

DETAILED DESCRIPTION OF PRESENT EXAMPLE EMBODIMENTS

Here, a method is presented to detect field order problems in video content by the sliding-window comparison of a target field (top or bottom) with three neighbouring opposite-phase fields. For each analysed field, a number of measures are generated and used to make an "instant" classification of the frame containing the target field. These frame results are buffered and corresponding "windowed" decisions made. The "instant" and "windowed" results are used in a "combined" analysis technique to identify video field-ordering properties and the nature and location of potential field-ordering problems. Furthermore, the technique is enhanced by an "instant"-only method for identifying problem areas of frame-repeated progressive content.

2. PICTURE STRUCTURES

A brief description of interlaced and progressive video properties is given in this section prior to the description of the analysis technique in Section 3.

2.1 Interlaced Video

A top-field-first interlaced video sequence may be represented as a sequence of alternating top and bottom fields as shown in FIG. 1.

Temporally, the B fields should be half-way between the neighbouring T fields. Spatially, a B field will be offset vertically down by 1 line on the output display device and interlaced with the corresponding T field, as shown in FIG. 2.

For PAL-625 system "I" standard-resolution display (720×576 active samples per frame), a visible picture would consist of TFF interlaced 288-line T and B fields with a field update rate of 50 Hz (frame-rate of 25 Hz). For NTSC-525 system "M" standard resolution display (720×480 active samples per frame), a visible picture would consist of BFF interlaced 240-line T and B fields with a field update rate of 59.94 Hz (frame-rate of 29.97 Hz).

2.2 Progressive Video

Progressive video sequences have frames made up of lines from just one time-interval, such as generated by cine-film cameras and more recently digital video (DV) cameras. Considering fields presented for interlaced display, progressive sequences would have the temporal characteristics represented in FIG. 3, where corresponding top and bottom fields cover identical time intervals. These fields would, however, still be spatially interlaced according to FIG. 2 and, in the display, temporally interlaced according to FIG. 1.

Frame-repeated progressive video, as illustrated in FIG. 4, might be found in cartoon content. The pattern of repeated frames is typically regular however irregular repeats are also possible.

2.3 Field Ordering Problems

There follows a brief consideration of how field-ordering properties of both interlaced and progressive content may cause problems for interlaced display.

2.3.1 Interlaced Content

The interlaced display of content with incorrect field-ordering can cause noticeable degradations. If BFF interlaced content is displayed TFF then a "juddering" effect may be visible within areas of motion. This problem is illustrated in FIGS. 5 and 6. 5 shows BFF field-timing for an 'X' pattern moving at a constant rate across the display.

FIG. 6 shows the field-ordering for correct BFF display and also the field ordering for incorrect TFF display. The discontinuity in the motion of the 'X' is evident for the TFF display.

2.3.2 Progressive Content

One might expect there not to be a problem with field-ordering for progressive content, as a pair of fields derived for interlaced playback from one progressive frame would be from the same time interval. No motion "juddering"

should occur for either field-ordering in playback. However, there are a number of video editing and processing operations that can make the interlaced playback of progressive content sensitive to field ordering.

Frame-rate conversion, between cine-film (24 frames/s), PAL (25 frames/s) and NTSC (29.97 frames/s) can involve the addition and removal of fields from the original sequence. The insertion or deletion of a field within a frame causes subsequent frames to consist of fields from different time intervals, making interlaced display field-order sensitive. Field-level editing, such as cutting and fading, can also introduce such field-order sensitivity when applied to progressive content.

FIG. 7 shows the frame structure of progressive content with field-misalignment. Here the progressive content has been separated into fields, with matching progressive fields put in separate frames. This separation requires TFF interlaced playback and incorrect BFF playback could cause visible motion juddering. This problem will be called TFF field-misalignment, as TFF interlaced playback is required to avoid problems.

FIG. 8 illustrates progressive frame-repeated content with BFF field-misalignment. In this case, TFF interlaced playback could base motion juddering.

Another example of field-misaligned progressive content, as observed in real cartoon content, is illustrated in FIG. 9. Here, cartoon content, that is predominantly frame-repeated and progressive in nature, has BFF field-misalignment in frame 4 as a result of there being unequal numbers of matching top and bottom fields within the content. TFF interlaced display of such content would give motion discontinuity at this transition, which, if frequently occurring, could be perceptible.

Apart from the more persistent motion juddering, such field-level transitions can also cause visible problems at scene cuts. For the example shown in FIG. 9, if the fields T1/B1 and T2/B2 belonged to scene 1 (grey) and T3/B3 onwards to scene 2 (white), then TFF and BFF display of the sequence would give the field sequences shown in FIG. 10. TFF interlaced playback would give a scene change discontinuity, with a field from scene 2 played between two fields from scene 1.

3. FIELD-ORDER ANALYSIS ALGORITHM

There follows a description of a technique for the detection of potentially visible field-order problems within video content subjected to interlaced display. The technique operates on either a sequence of fields or frames in a pixel intensity representation and relies on a sliding comparison between fields from 3 successive frames. FIG. 11 shows a representation of the proposed process, which accepts video content frames and outputs a field-ordering error flag, wEFlag, a content decision flag, wOFlag and an instant decision flag, iOFlag.

The technique consists of two main processing paths handling "instant" (highlighted grey) and "windowed" parameter sets. The apparatus comprises two buffers Dif_buf and IDFlag_buf and ten function units Func1, Func2, etc. These could if desired be constructed as separate program-controlled processors, or if preferred the functions of two or more units could be performed by a single processor. A description of the function of each unit will now follow.

3.1 Func1—Field Difference Measure

Each input video frame, video(n), may be considered to consist of an interlaced pair of top and bottom fields, T(n) and B(n). For each frame, three difference calculations are performed to indicate the match between the target field of one type, which is either the top or bottom field of the current frame, and the three second type, or opposite phase, fields of the previous, current and next frames. This process is illustrated for a bottom field target in FIG. 12.

Using mean of absolute difference between pixel intensity values, the difference calculations may be defined as:

$$DIF1(n) = (1/XY) \sum_{y=0}^{Y-1} \sum_{x=0}^{X-1} \text{abs}(B(n, x, y) - T(n-1, x, y)) \quad (3.1)$$

$$DIF2(n) = (1/XY) \sum_{y=0}^{Y-1} \sum_{x=0}^{X-1} \text{abs}(B(n, x, y) - T(n, x, y)) \quad (3.2)$$

$$DIF3(n) = (1/XY) \sum_{y=0}^{Y-1} \sum_{x=0}^{X-1} \text{abs}(B(n, x, y) - T(n+1, x, y)) \quad (3.3)$$

In (3.1) to (3.3), B(n,x,y) represents the pixel intensity value of pixel position x horizontal and y vertical in the bottom field of the n'th frame and X and Y are the total number of horizontal and vertical pixels respectively. T(n, x,y) represents the same pixel position in the corresponding top field.

It will be noted that the difference signals represented by Equations 3.1, 3.2 and 3.3 are differences between two fields which necessarily have a vertical spatial offset from one another which will therefore give rise to non-zero difference values even in the case where there is no motion. We have not found this to be a serious problem in practice, but reliability can be improved by applying one of the known techniques for alleviating this problem. Techniques to reject interlaced spatial artefacts, through methods such as "coring" and "diamond motion analysis" [2 . . . 9], would be of particular benefit in the matching of fields. In another approach, one can disregard individual difference values (i.e. before summation) that fall below a threshold, and/or evaluate the difference between a pixel and the corresponding pixel on both the line above it and the line below it on the other field, taking the smaller of the two.

The results quoted below used both these expedients, Equation 3.1 being replaced by $$DIF1(n) = (1/XY) \sum_{y=0}^{Y-1} \sum_{x=0}^{X-1} \text{if min}[\text{abs}(B(n, x, y) - T(n-1, x, y)),$$
$$\text{abs}(B(n, x, y) - T(n-1, x, y+1))] >$$
$$\text{threshold then min}[\text{abs}(B(n, x, y) - T(n-1, x, y)),$$
$$\text{abs}(B(n, x, y) - T(n-1, x, y+1))]\text{else } 0$$

and similarly for Equations 3.2 and 3.3:

$$DIF2(n) = (1/XY) \sum_{y=0}^{Y-1} \sum_{x=0}^{X-1} \text{if min}[\text{abs}(B(n, x, y) - T(n, x, y)),$$
$$\text{abs}(B(n, x, y) - T(n, x, y+1))] >$$
$$\text{threshold then min}[\text{abs}(B(n, x, y) - T(n, x, y)),$$
$$\text{abs}(B(n, x, y) - T(n, x, y+1))]\text{else } 0$$

-continued $$DIF3(n) = (1/XY)\sum_{y=0}^{Y-1}\sum_{x=0}^{X-1} \text{if } \min[\text{abs}(B(n, x, y) - T(n+1, x, y)),$$

$$\text{abs}(B(n, x, y) - T(n+1, x, y+1))]: >$$

$$\text{threshold then } \min[\text{abs}(B(n, x, y) - T(n+1, x, y)),$$

$$\text{abs}(B(n, x, y) - T(n+1, x, y+1))]\text{else } 0$$

These compensated equations were used in the tests reported below

If a top field is chosen as target then the equations are the same except that "T" and "B" are transposed.

In this specification, references to "previous", "next", "following" or the like frames refer to the frames considered in capture-and-display order, even though a particular coding scheme may vary the order of transmission.

3.2 Func2—Windowed Field Difference Measure

The set of 3 difference values, DIF1 . . . 3(n), are then entered into the difference buffer, where the previous K-1 sets of difference values are also stored. Func2 then performs time-averaging of the difference parameters according to equations (3.4) to (3.6).

$$wDIF1(n) = (1/K)\sum_{i=0}^{K-1} DIF1(n-i) \quad (3.4)$$

$$wDIF2(n) = (1/K)\sum_{i=0}^{K-1} DIF2(n-i) \quad (3.5)$$

$$wDIF3(n) = (1/K)\sum_{i=0}^{K-1} DIF3(n-i) \quad (3.6)$$

3.3 Func3—Windowed Decision Parameters

For each frame, the averaged difference values wDIF1 . . . 3 are ranked in order of magnitude wRank1 . . . wRank3, such that wRank1 is equal to the maximum value and wRank3 the minimum. The variables wIndex1 . . . wIndex3 are set to the corresponding index numbers, so that if wDIF2 was the maximum and wDIF1 the minimum, then wIndex1 would equal 2, wIndex2 would equal 3 and wIndex3 would equal 1. Windowed decision parameters are then calculated according to equations (3.7) to (3.9)

$$wMotionFlag(n)=((wRank1(n)-wRank3(n)>MThresh1) \text{ AND}(wRank1(n)>MThresh2)) \quad (3.7)$$

$$wParam1(n)=100.0*(wRank2(n)-wRank3(n))/(wRank1(n)-wRank3(n)) \quad (3.8)$$

$$wParam2(n)=100.0*wRank3(n)/wRank2(n) \quad (3.9)$$

Possible settings for MThresh1 and MThresh2 are given in Table 3.15.

The motion parameter, wMotionFlag, indicates that there is sufficient motion for a meaningful field-ordering decision to be made. This parameter depends on comparisons of absolute and relative DIF values with appropriate thresholds according to equation (3.7). Parameter, wParam1, represents the difference between the $2^{nd}$ and $3^{rd}$ ranked DIF values as a percentage of the range of the DIF values and is intended to reflect the feature of two DIF values being nearly the same and significantly less than the remaining value. This parameter is based purely on differences and would be unaffected by an offset applied equally to all 3 difference values. Parameter wParam2 represents the ratio of the minimum to the middle DIF value as a percentage and is intended to reflect the overall significance of the difference between the two smallest DIF values.

3.4 Func4—Windowed Decision Intermediate Flags

A decision on interlaced field-order properties for the n'th frame may be made by testing WParam1 and WParam2 against thresholds according to equations (3.10) and (3.11).

$$wIFlag1(n)=((wParam1(n)<iThresh1)\text{AND}(wParam2(n)>iThresh2) \text{ AND}(wMotionFlag(n))) \quad (3.10)$$

$$wIFlag2(n)=wIndex1 \quad (3.11)$$

Suitable threshold values are given in Table 3.15 and the resulting flags may be interpreted according to Table 3.1.

TABLE 3.1

Explanation of interlaced decisions.

| wIFlag1 | wIFlag2 | Content type | Test condition |
|---|---|---|---|
| True | 1 | TFF Interlaced | (DIF2 ≈ DIF3) < DIF1 |
| True | 2 | Interlaced error | (DIF1 ≈ DIF3) < DIF2 |
| True | 3 | BFF Interlaced | (DIF1 ≈ DIF2) < DIF3 |
| False | — | Unknown/low motion | None of above/low motion |

A decision on progressive field-order properties for the n'th frame may be made by testing wParam1 and wParam2 against thresholds according to equations (3.12) and (3.13).

$$wPFlag1(n)=((wParam1(n)>pThresh1)\text{AND}(wParam2(n)<pThresh2)\text{AND}(wMotionFlag(n)) \quad (3.12)$$

$$wPFlag2(n)=wIndex3 \quad (3.13)$$

Decision threshold pThresh1 is set according to Table 3.2 and defines acceptance bands for the wParam1 parameter. Suitable threshold values are given in Table 3.15.

TABLE 3.2

Progressive decision thresholds

| wPFlag2 | Content type | pThresh1 |
|---|---|---|
| 1 | BFF misaligned progressive | pThresh1a |
| 2 | Correctly aligned progressive | pThresh1b |
| 3 | TFF misaligned progressive | pThresh1a |

The resulting flags may be interpreted according to Table 3.3.

TABLE 3.3

Explanation of progressive decisions.

| wPFlag1 | wPFlag2 | Content type | Test condition |
|---|---|---|---|
| True | 1 | BFF misaligned progressive | (DIF1 ≈ 0) << DIF2 < DIF3 |
| True | 2 | Correctly aligned progressive | (DIF2 ≈ 0) << (DIF1 ≈ DIF3) |

TABLE 3.3-continued

Explanation of progressive decisions.

| wPFlag1 | wPFlag2 | Content type | Test condition |
|---------|---------|--------------|----------------|
| True | 3 | TFF misaligned progressive | (DIF3 ≈ 0) << DIF2 < DIF1 |
| False | — | Unknown/low motion | None of above/low motion |

The thresholds set for the interlaced and progressive decisions ensure that I and P "True" decisions are mutually exclusive.

3.5 Func5—Windowed Decision Flag

The intermediate decisions flags are then combined according to Table 3.4 to give a single "windowed" decision flag, wDFlag. Note that here, and in other Tables that serve to define the algorithm, the resultant of the operation is shown in the right-hand column.

Tables that are merely explanatory are labelled "Explanation of . . . ".

TABLE 3.4

Combined interlaced/progressive decision flag

| wIFlag1 | wIFlag2 | wPFlag1 | wPFlag2 | wDFlag |
|---------|---------|---------|---------|--------|
| True | 1 | False | — | 0 = TFF Interlaced |
| True | 2 | False | — | 1 = Interlaced error |
| True | 3 | False | — | 2 = BFF Interlaced |
| False | — | True | 1 | 3 = BFF misaligned progressive |
| False | — | True | 2 | 4 = Correctly aligned progressive |
| False | — | True | 3 | 5 = TFF misaligned progressive |
| False | — | False | — | 6 = Unknown/low motion |
| True | — | True | — | Error |

3.6 Func3a—Instant Parameters (iParam1,iParam2)

Func3a uses the ranking process described in Section 3.3 to produce "instant" ranked parameters, iRank1 . . . 3 and iIndex1 . . . 3, from difference values, DIF1 (n) . . . DIF3(n). The resulting "instant" parameter values, iParam1 and iParam2, are calculated according to equations (3.14) and (3.16).

$$iMotionFlag(n) = ((iRank1(n) - iRank3(n) > MThresh1) \text{ AND} (iRank1(n) > MThresh2)) \quad (3.14)$$

$$iParam1(n) = 100.0 * (iRank2(n) - iRank3(n))/(iRank1(n) - iRank3(n)) \quad (3.14)$$

$$iParam2(n) = 100.0 * iRank3(n)/iRank2(n) \quad (3.16)$$

3.7 Func4a—"Instant" Decision Intermediate Flags

A decision on interlaced field-order properties for frame n may be made by testing iParam1 and iParam2 against thresholds according to equations (3.17) and (3.18).

$$iIFlag1(n) = ((iParam1(n) < iThresh1) \text{ AND} (iParam2(n) > iThresh2) \text{ AND} (iMotionFlag(n))) \quad (3.17)$$

$$iIFlag2(n) = iIndex1 \quad (3.18)$$

The resulting flags may be interpreted according to Table 3.5.

TABLE 3.5

Explanation of "Instant" interlaced decisions.

| iIFlag1 | iIFlag2 | Content type | Test condition |
|---------|---------|--------------|----------------|
| True | 1 | TFF Interlaced | (DIF2 ≈ DIF3) < DIF1 |
| True | 2 | Interlaced error | (DIF1 ≈ DIF3) < DIF2 |
| True | 3 | BFF Interlaced | (DIF1 ≈ DIF2) < DIF3 |
| False | — | Unknown/low motion | None of above/low motion |

A decision on progressive field-order properties for frame n may be made by testing iParam1 and iParam2 against thresholds according to equations (3.19) and (3.20).

$$iPFlag1(n) = ((iParam1(n) > pThresh1) \text{ AND } (iParam2(n) < pThresh2) \text{ AND} (iMotionFlag(n))) \quad (3.19)$$

$$iPFlag2(n) = iIndex3 \quad (3.20)$$

Decision threshold pThresh1 is set according to Table 3.2 and defines acceptance bands for the iParam1 parameter. The resulting flags may be interpreted according to Table 3.6.

TABLE 3.6

Explanation of "Instant" progressive decisions.

| iPFlag1 | iPFlag2 | Content type | Test condition |
|---------|---------|--------------|----------------|
| True | 1 | BFF misaligned progressive | (DIF1 ≈ 0) << DIF2 < DIF3 |
| True | 2 | Correctly aligned progressive | (DIF2 ≈ 0) << (DIF1 ≈ DIF3) |

TABLE 3.6-continued

Explanation of "Instant" progressive decisions.

| iPFlag1 | iPFlag2 | Content type | Test condition |
|---|---|---|---|
| True | 3 | TFF misaligned progressive | (DIF3 ≈ 0) << DIF2 < DIF1 |
| False | — | Unknown/low motion | None of above/low motion |

The thresholds set for the interlaced and progressive decisions ensure that I and P "True" decisions are mutually exclusive and example values are given in Table 3.15 below.

3.8 Func5a—Instant Decision Flag (iDFlag)

The "instant" intermediate decisions flags are combined according to Table 3.7 to give a single "instant" decision flag, iDFlag.

TABLE 3.7

Combined interlaced/progressive decision flag

| iIFlag1 | iIFlag2 | iPFlag1 | iPFlag2 | iDFlag |
|---|---|---|---|---|
| True | 1 | False | — | 3 = TFF Interlaced |
| True | 2 | False | — | 4 = Interlaced error |
| True | 3 | False | — | 5 = BFF Interlaced |
| False | — | True | 1 | 0 = BFF misaligned progressive |
| False | — | True | 2 | 1 = Correctly aligned progressive |
| False | — | True | 3 | 2 = TFF misaligned progressive |
| False | — | False | — | 6 = Unknown/low motion |
| True | — | True | — | Error |

The instant decision flag for the n'th frame, iDFlag(n), is entered into the "Instant Flag Buffer" iDFlag_buf, where it is stored with the previous K-1 instant flag values according to equations (3.21) and (3.22).

$$iDFlag\_buf(k) = iDFlag\_buf(k-1) \quad k = K \ldots 2 \quad (3.21)$$

$$iDFlag\_buf(1) = iDFlag(n) \quad (3.22)$$

3.9 Func5b—Tally Decision Flag (tDFlag) and Instant Output Flag (iDFlag)

The K most recent instant flag values stored in the "instant flag buffer" iDFlag_buf are processed in Func5b to produce a tally flag, tDFlag. Firstly, the flag buffer is analysed to find how many times each possible iDFlag value (0 . . . 6) occurs in the instant buffer, iDFlag_buf. This is performed according to equation (3.23).

$$tally(i) = \sum_{k=1}^{K} f1(iDFlag\_buf(k), i) \quad (3.23)$$
$$i = 0 \ldots 6$$

The operator f1 is defined in equation (3.24)

$$f1(k,i) = 1 \text{ if } (k=i) \ f1(k,i) = 0 \text{ else} \quad (3.24)$$

A set of seven tally counts is produced, as shown in Table 3.8.

TABLE 3.8

Explanation of instant tally results.

| iDFlag | Tally |
|---|---|
| 0 = BFF misaligned progressive | Tally(0) |
| 1 = Correctly aligned progressive | Tally(1) |
| 2 = TFF misaligned progressive | Tally(2) |
| 3 = BFF interlaced | Tally(3) |
| 4 = Interlaced error | Tally(4) |
| 5 = TFF interlaced | Tally(5) |
| 6 = Unknown/low motion | Tally(6) |

Then, the six instant tally counts corresponding to "known" states are analysed to find the flag value, tallyMax, whose tally value is both the maximum of the six and greater than a decision threshold, TyThresh1. This process is described by Table 3.9.

TABLE 3.9

TallyMax condition

| Condition | tallyMax |
|---|---|
| (tally(k) > tally(i)) AND (tally(k) > TyThresh1), i ≠ k, 0 ≤ i ≤ 5 | k |
| Else | 6 |

The instant tally flag, tDFlag, is then set according to Table 3.10. This flag will only return an index to a "known" field ordering condition (0≤iDFlag≤5) when the corresponding tally value is greater than the decision threshold, TyThresh1, and there are no other "known" or "error" conditions present in the buffer.

TABLE 3.10

Tally decision flag (tDFlag)

| Condition | tDFlag |
|---|---|
| tally(tallyMax) + tally(6) = K | tallyMax |
| Else | 6 |

Func5b also incorporates "instant intermittent" analysis, a procedure for detecting intermittent field misalignment in progressive content. Firstly, the progressive state that will potentially give visible errors, TestFlag, is determined according to Table 3.11, where the IDFO (Interlaced Display Field Ordering) flag indicates whether the interlaced display is TFF or BFF. The IDFO flag indicates the supposed or alleged temporal relationship of the fields may be derived from the incoming signal, or may be input manually by the user.

TABLE 3.11

| | Progressive mis-alignment test flag (TestFlag) |
|---|---|
| IDFO | TestFlag |
| TFF | 0 = BFF misaligned progressive |
| BFF | 2 = TFF misaligned progressive |

If IDFO signals TFF, then BFF misaligned progressive content might produce visible motion distortions and TestFlag is set to 0 (BFF). If IDFO signals BFF, then TestFlag is set to 2 (TFF). TestFlag is then used in a test of whether a significant number of potentially visible field misalignments have been detected in the instant flag buffer. The resulting instant output flag, iOFlag, is set according to Table 3.12. See Table 3.15 for threshold values.

TABLE 3.12

| Instant output error flag (iOFlag) | |
|---|---|
| Condition | iOFlag |
| Tally(TestFlag) > TyThresh2 | TestFlag |
| Else | 6 |

3.10 Func5c—Windowed Output Flags (wOFlag, wEFlag)

For a given buffer of frames, the "instant tally flag", tDFlag, reflects a condition where the majority of "instant" decision values have identical "known" conditions and all other decision values have the "unknown" condition. The flag, tDFlag, is combined with the windowed decision flag, wDFlag, according to Table 3.13 to produce the overall decision. flag, wOFlag. This effectively copies the value of wDFlag to wOFlag if the instant tally flag is identical else an "unknown" condition is set.

TABLE 3.13

| Combination of wDFlag and tDFlag | | |
|---|---|---|
| wDFlag | tDFlag | wOFlag |
| 0-6 | wDflag | wDFlag |
| 0-6 | ≠wDFlag | 6 (Unknown) |

The output decision, wOFlag, indicates the frame properties (interlaced or progressive) and the field order properties for the buffered segment of content. Further processing is applied to indicate, through the error flag, wEFlag, whether the properties detected might cause visible errors for interlaced display. This function requires the additional input, IDFO (Interlaced Display Field Order) and is defined in Table 3.14. It should be noted that TFF misaligned progressive content output on a TFF interlaced display would not be flagged as an error and neither would BFF misaligned progressive on a BFF display.

TABLE 3.14

| Error flag wEFlag | | |
|---|---|---|
| wOFlag | IDFO | wEFlag |
| 0 = BFF misaligned progressive | TFF | 1 - Error |
| 1 = Correctly aligned progressive | TFF | 0 - No Error |
| 2 = TFF misaligned progressive | TFF | 0 - No Error |
| 3 = BFF interlaced | TFF | 1 - Error |
| 4 = Interlaced error | TFF | 1 - Error |
| 5 = TFF interlaced | TFF | 0 - No Error |
| 0 = BFF misaligned progressive | BFF | 0 - No Error |
| 1 = Correctly aligned progressive | BFF | 0 - No Error |
| 2 = TFF misaligned progressive | BFF | 1 - Error |
| 3 = BFF interlaced | BFF | 0 - No Error |
| 4 = Interlaced error | BFF | 1 - Error |
| 5 = TFF interlaced | BFF | 1 - Error |
| 6 = Unknown | BFF/TFF | 0 - No Error |

3.11 Output Flag Parameters (wOFlag, wEFlag, iOFlag)

The output flags wEFlag and wOFlag reflect the results of the windowed analysis of field order properties. Parameters are averaged over a number of frames and refined by results from frame-by-frame "instant" results over the same period. As such, this analysis is sensitive to repetitive field-ordering conditions and may be considered to be a reliable detector of general content properties.

The output flag iOFlag is based on the analysis of frame-by-frame "instant" properties only and is sensitive to intermittent progressive field misalignments. The events handled by this flag are unlikely to be detected by the windowed analysis and the analysis therefore offers an additional warning for potentially visible errors. However, the nature of the "instant" test makes it more susceptible to misdetection and should be considered as a supplementary warning flag to the more reliable windowed results.

Further statistical analysis of these flags may be necessary to meet the requirements of differing applications.

3.12 Settings and Thresholds

The choice of decision thresholds will depend on the intended use of this field-order analysis algorithm. Table 3.15 shows a set of thresholds that suitable for the detection of potential field-ordering problems for standard resolution television systems.

TABLE 3.15

| Setting and thresholds for Standard Resolution television | | |
|---|---|---|
| Name | Value | Comment |
| K | 20 | Buffer length (frames) |
| TyThresh1 | 4 | Tally detection threshold |
| MThresh1 | 0.02 | Motion threshold |
| MThresh2 | 0.02 | Motion threshold |
| TyThresh2 | 3 | Tally detection threshold for instant flag |
| iThresh1 | 15.0 | Max. threshold ($2^{nd}$-min/max-min) |
| iThresh2 | 70.0 | Min. threshold (min/2nd) |
| pThresh1b | 80.0 | Max. threshold2 ($2^{nd}$-min/max-min) |
| pThresh1a | 25.0 | Min. threshold1 ($2^{nd}$-min/max-min) |
| pThresh2 | 10.0 | Max threshold (min/2nd) |

4 ALGORITHM FUNCTION AND PERFORMANCE

There follows a consideration of function and performance of the key aspects of the field-detection algorithm described in section 3. Firstly, consideration is given in Sections 4.1 and 4.2 to the properties of "instant" and "windowed" decision parameters for interlaced and non-frame repeated progressive video. Then in Section 4.3 the benefits of combining "instant" and "windowed" parameters are presented.

4.1 Decision Parameter Properties for Interlaced Video

Considering FIG. 12 for interlaced content, the expected time position of B(n) would be between T(n−1) and T(n) for BFF and between T(n) and T(n+1) for TFF. If there is significant motion between the fields, then field-ordering may be determined by a frame-by-frame comparison of the DIF values produced by Func1. Table 4.1 shows the expected DIF values for TFF and BFF interlaced video.

TABLE 4.1

Expected DIF conditions for interlaced content.

| Field order | Condition |
|---|---|
| TFF | (DIF2 ≈ DIF3) < DIF1 |
| BFF | (DIF1 ≈ DIF2) < DIF3 |

The DIF values for successive frames of a 7 second TFF interlaced sequence were calculated according to Func1 and are shown in FIG. 13. It can be seen that these "instant" frame values broadly satisfy the TFF test condition.

The noisy nature of the parameters may be handled by time-averaging and FIG. 14 shows the content from FIG. 13 with sliding 20-frame window averaging applied according to Func2.

Corresponding "instant" and "windowed" decision parameters calculated according to Func3 and Func3a are shown in FIGS. 15 and 16 respectively along with the corresponding interlaced decision thresholds, iThresh1 and iThresh2.

Parameter1 is intended to reflect the feature of two DIF values being nearly the same and significantly less than the remaining value and Parameter2 is intended to reflect the overall significance of the difference between the maximum and minimum DIF values. "Instant" and "windowed" decisions of interlaced type for the n'th frame are made by testing Param1 and Param2 against thresholds, (func4) and (func4a). Successful detection of an interlaced type requires Parameter1 to be below iThresh1 and Parameter2 to be above iThresh2. The benefits of "windowing", particularly for parameter 1, are clear from these graphs.

4.2 Decision Parameter Properties for Progressive Content (Non-Frame Repeated)

Considering FIG. 12 for progressive content without frame repeats, field B(n) should be time-aligned with T(n). However, editing/processing might cause field B(n) to align with T(n−1) (BFF misaligned) or T(n+1) (TFF misaligned). If there is significant motion between successive frames, then field alignment may be determined by using the same DIF value comparisons as proposed for interlaced content. For such progressive content, Table 4.2 shows the expected DIF conditions for the progressive alignments.

TABLE 4.2

Expected conditions for progressive content.

| B(n) alignment | Test | Comment |
|---|---|---|
| T(n − 1) | (DIF1 ≈ 0) << DIF2 < DIF3 | BFF misaligned |
| T(n) | (DIF2 ≈ 0) << (DIF1 ≈ DIF3) | Correctly aligned |
| T(n + 1) | (DIF3 ≈ 0) << DIF2 < DIF1 | TFF misaligned |

FIG. 17 shows "windowed" DIF values for 8 seconds of correctly aligned progressive content exhibiting the expected condition of (DIF2≈0)<<(DIF1≈DIF 3). FIG. 18 shows "windowed" DIF values for progressive content with TFF misalignment, where (DIF3≈0)<<DIF2<DIF1.

The corresponding windowed parameter values, wParam1 and wParam2, for FIGS. 17 and 18 are shown in FIGS. 19 and 20 respectively.

For progressive content with significant motion between frames, a value of wParam2≈0 clearly distinguishes both correctly and incorrectly aligned content from interlaced content. For correctly aligned progressive content, the value of WParam1 would be expected to be near 100% due to the small separation of the first and second ranked difference values. However, for misaligned progressive content, this feature is not present and an expected range of WParam1>25% might be used to provide additional confidence to the discrimination.

4.3 Combining "Instant" and "Windowed" Parameters

The "windowed" decision parameters for both interlaced and non-frame-repeated progressive video are generally stable, offering reliable identification of field-ordering properties. However, events including scene-cuts, fast fades and fast pans may produce instant DIF values that make the "windowed" parameters temporarily unreliable.

FIG. 21 shows the DIF parameters for a TFF interlaced sequence with a scene cut around frame 35. FIG. 22 shows the equivalent "instant" parameter values and FIG. 23 the "windowed" parameters.

The key feature of this content is the scene cut at frame 35, which causes the distinct peaks in the DIF1 and DIF3 measures. The scene cut is preceded by a period of low and reducing motion from frame 21, which is reflected by all three DIF values in FIG. 21 approaching zero.

The low motion of frames 27 to 31 fails to set the "instant" motion flag in Equation 3.14 and is indicated by the zeroing of both "instant" decision parameters in FIG. 22. For interest this also occurs at frames 34, 67, 88, 89 and onwards from 97. Scene cuts have the property for "instant" analysis of returning an "unknown" classification rather than a "known" misclassification for the frames that are part of the cut. This short-lived effect can be observed in FIG. 22. However, other than for the scene cut and the low motion frames, FIG. 22 shows a fairly good "instant" classification of TFF interlaced content.

The advantage of "windowing" is clearly shown in FIG. 23, with reliable and stable TFF classification up to frame 32 and beyond frame 53. However, a disadvantage is clear from frame 33 to 52, where the relatively large DIF values at the scene cut have distorted the "windowed" parameters for the 20 frame duration of the window. Table 4.3 shows this in detail, with "instant" and "windowed" DIF values shown side-by-side.

TABLE 4.3

Frame values for TFF interlaced scene cut

| Frame | DIF1 | DIF2 | DIF3 | wDIF1 | wDIF2 | wDIF3 | tDFlag | wDFlag | wOFlag |
|---|---|---|---|---|---|---|---|---|---|
| 31 | 0.016 | 0.009 | 0.011 | 0.52 | 0.072 | 0.074 | 5 | 5 | 5 |
| 32 | 0.013 | 0.01 | 0.012 | 0.44 | 0.059 | 0.062 | 5 | 5 | 5 |
| 33 | 0.022 | 0.01 | 0.032 | 0.364 | 0.046 | 0.049 | 5 | 5 | 5 |
| 34 | 0.083 | 0.02 | 28.164 | 0.296 | 0.036 | 1.448 | 5 | 6 | 6 |
| 35 | 30.989 | 0.003 | 0.017 | 1.783 | 0.028 | 1.44 | 6 | 1 | 6 |
| 36 | 0.38 | 0.042 | 0.055 | 1.749 | 0.023 | 1.437 | 6 | 1 | 6 |
| 37 | 0.608 | 0.067 | 0.117 | 1.734 | 0.022 | 1.439 | 6 | 1 | 6 |
| 38 | 0.825 | 0.164 | 0.184 | 1.74 | 0.027 | 1.445 | 6 | 1 | 6 |
| 39 | 1.116 | 0.175 | 0.214 | 1.772 | 0.034 | 1.453 | 6 | 1 | 6 |
| 40 | 1.26 | 0.204 | 0.223 | 1.816 | 0.042 | 1.462 | 5 | 1 | 6 |
| 41 | 1.255 | 0.169 | 0.135 | 1.865 | 0.05 | 1.467 | 5 | 1 | 6 |

Table 4.3 also shows that, not only does the scene-cut distort the following "windowed" DIF values, but it also causes the "windowed" decision, wDFlag, to return a misclassification of "1=Correctly aligned progressive" for frames 35 onwards.

The field-order classification method described in Section 3 overcomes the problems of scene cuts, and more generally high motion fades and pans, by combining "instant" and "windowed" techniques. The "instant" parameters are more variable in nature, but far more robust to such conditions than the "windowed" parameters. Table 4.3 shows that the combined decision, wDFlag, rejects the misclassification from the "windowed" analysis, wDFlag.

Twenty minutes of TFF interlaced standard resolution television was analysed and the "windowed" and "combined" classification results are presented in FIG. 24. It can be seen that the small proportion of misclassifications to progressive by the "windowed" analysis is removed by the "combined" analysis.

4.4 Frame-Repeated Progressive Content

Progressive content with repeated frames (FIG. 4) presents the special problem that each bottom field tested may have identical time alignment with at least two top fields. FIG. 25 shows "instant" DIF values for correctly aligned 2× frame-repeated progressive content. As each bottom field being tested is time-aligned to the corresponding top field and, alternately, the preceding and next top fields, then DIF2 is constantly near zero and DIF1 and DIF3 are saw-tooth in nature.

FIG. 26 shows instant DIF values for BFF misaligned 2× frame-repeated content (FIG. 8). Here, for every frame DIF1≈0 and DIF1<<DIF3 and for alternate frames DIF2≈DIF1 and DIF2 ≈DIF3.

Such regular-frame repeating would require the "windowed" analysis described in Section 3 to be modified, as time-averaging the DIF values shown in FIGS. 25 and 26 according to equations 3.4 to 3.6 would not be sensible. If the nature of the frame-repeating was guaranteed to be regular and consistent, then techniques such as median-smoothing might be incorporated prior to "windowed" analysis. However, cartoon content has been found to often have time-varying frame-repeating properties with random field misalignments.

Rather than looking to classify all regions of such content, the technique described in Section 3 aims to identify only potentially visible misalignments. This is achieved within Func5*b* by searching the "instant" flag buffer for potentially problematic patterns. This technique benefits from the high reliability of the "instant" decisions for progressive content.

Ten minutes of standard resolution progressive cartoon content with variable frame-repeating and BFF misalignment was analysed for a target TFF display. FIG. 27 shows the classification results for combined analysis, wOFlag, and "instant intermittent" analysis, iOFlag. The "instant intermittent" test can be seen to add significantly to the sensitivity of the algorithm to irregular problem field misalignments. It is particularly useful for its ability to cope with varying degrees of frame-repeating, which is a condition that is not handled well by the "windowed" analysis.

5. CONCLUSION

The technique described here has been designed to identify potential field-ordering problems for the interlaced display of progressive and interlaced content. A sliding 3-frame analysis window is used to generate "instant" and "windowed" sets of field difference measures, from which corresponding "instant" and "windowed" decision parameters are derived. These parameters are designed to reflect key identifying features of the field-ordering of progressive and interlaced video sequences. A combination of "windowed" and "instant" analysis has been shown to offer a reliable classification technique able to handle both interlaced and progressive sequences. The "combined" analysis makes the technique particularly robust to misclassification at scene-cuts, high motion pans and fades or with frame-repeated progressive content. Furthermore, the identification of potential problems in frame-repeated progressive content is enhanced by the inclusion of an "instant"-only test for irregular or intermittent problems.

6. REFERENCES

[1] ITU-R Rec. BT.601, "Studio encoding parameters of digital television for standard 4:3 and wide screen 16:9 aspect ratios," http://www.itu.int/rec/R-REC-BT.601/en.
[2] Kahn and Sanders, "Detection of progressive frames in a video field sequence," U.S. Pat. No. 6,563,550, May 13, 2003.
[3] Casavant, Hurst, Perlman, Isnardi and Aschwanden, "Video/film-mode detector using patterns of 2-field differences", U.S. Pat. No. 5,317,398, May 1994.
[4] Westerman and Modem, "System for identifying video fields generated from film sources," U.S. Pat. No. 6,157,412, December 2000.
[5] Honda and Nagakubo, "Method for identifying input video signal and processing the video signal," U.S. Pat. No. 6,154,257, November 2000.

[6] Swartz, "Film source video detection," U.S. Pat. No. 6,014,182, January 2000.
[7] Selby, "Method and apparatus for detecting motion between odd and even fields," U.S. Pat. No. 6,633,612, October 2003.
[8] Faroudja, Xu and Swartz, "Motion detection between even and odd fields within 2:1 interlaced television standard," U.S. Pat. No. 5,291,280, March 1994.
[9] Christopher and Correa, "Method and Apparatus for Identifying . . . ," U.S. Pat. No. 5,689,301, November 1997.

What is claimed is:

1. A method of detecting field order of a video signal, comprising:
   receiving successive digitally coded frames, each frame comprising data for a field of a first type and data for a field of a second type; where the field of the first type is one of a top field or a bottom field, and the field of the second type is the other one of the top field or the bottom field;
   generating for each field of the first type:
     a first difference signal representative of the difference between the field of the first type field of the current frame and the second-type field of the previous frame;
     a second difference signal representative of the difference between the field of the first type field of the current frame and the second-type field of the current frame; and
     a third difference signal representative of the difference between the field of the first type field of the current frame and the second-type field of the following frame;
   in dependence of a relationship between the values of all three of said difference signals, generating a decision signal indicating an estimated temporal relationship of the field of the first type field of the current frame to the second-type field of the current frame; and
   detecting the field order of the video signal from said decision signal.

2. A method according to claim 1 including receiving a signal indicating a purported temporal relationship, comparing it with the decision signal, and generating an alarm signal in the event of a mismatch.

3. A method according to claim 1 in which the decision signal depends also on difference signals obtained in respect of other fields of the first type.

4. A method according to claim 3 in which each difference signal is averaged over a plurality of frames to produce a respective averaged difference signal and the decision signal is obtained by analysing the averaged difference signals.

5. A method according to claim 3 comprising generating for each field of the first type an instantaneous decision signal dependent on said difference signals and then generating a combined decision signal dependent on the instantaneous decision signals over a plurality of frames.

6. A method according to claim 3 in which each difference signal is averaged over a plurality of frames to produce a respective averaged difference signal and a first decision signal is obtained by analysing the averaged difference signals; and comprising generating for each field of the first type an instantaneous decision signal dependent on said difference signals and then generating a second decision signal dependent on the instantaneous decision signals over a plurality of frames; and combining the first and second decision signals.

7. A system of detecting field order of a video signal, the system comprising:
   a processing system, including a computer processor, the processing system being configured to:
   receive successive digitally coded frames, each frame comprising data for a field of a first type and data for a field of a second type, where the field of the first type is one of a top field or a bottom field, and the field of the second type is the other one of the top field or the bottom field;
   generate for each field of the first type:
     a first difference signal representative of the difference between the field of the first type field of the current frame and the second-type field of the previous frame;
     a second difference signal representative of the difference between the field of the first type field of the current frame and the second-type field of the current frame; and
     a third difference signal representative of the difference between the field of the first type field of the current frame and the second-type field of the following frame;
   generate, based on a relationship between on the values of all three of said first, second, and third difference signals, an indicator corresponding to an estimated temporal relationship of the field of the first type field of the current frame to the second-type field of the current frame; and
   detect the field order of the video signal from said decision signal.

8. The system according to claim 7 wherein the processing system is further configured to receive a signal indicating a purported temporal relationship, compare it with the indicator, and generate an alarm signal in the event of a mismatch.

9. The system according to claim 7 in which the indicator depends also on difference signals obtained in respect of other fields of the first type.

10. The system according to claim 9 in which each difference signal is averaged over a plurality of frames to produce a respective averaged difference signal and the indicator is obtained by analyzing the averaged difference signals.

11. The system according to claim 9 wherein the processing system is further configured to generate for each field of the first type an instantaneous indicator dependent on said difference signals and then generate a combined indicator dependent on the instantaneous indicators over a plurality of frames.

12. The system according to claim 9 in which each difference signal is averaged over a plurality of frames to produce a respective averaged difference signal and a first indicator is obtained by analyzing the averaged difference signals; and the processing system is further configured to generate for each field of the first type an instantaneous indicator dependent on said difference signals and then generate a second indicator dependent on the instantaneous indicators over a plurality of frames; and combine the first and second indicators.

* * * * *